United States Patent
Yang et al.

(10) Patent No.: US 8,559,196 B2
(45) Date of Patent: Oct. 15, 2013

(54) OUTPUT VOLTAGE CONTROL CIRCUIT OF POWER CONVERTER FOR LIGHT-LOAD POWER SAVING

(75) Inventors: Ta-Yung Yang, Milpitas, CA (US); Wei-Hsuan Huang, Taoyuan County (TW); Chuh-Ching Li, Taoyuan County (TW); Rui-Hong Lu, Chiayi County (TW); Jenn-Yu G. Lin, Taipei Hsien (TW)

(73) Assignee: System General Corp., Taipei Hsien (TW)

( * ) Notice: Subject to any disclaimer, the term of this patent is extended or adjusted under 35 U.S.C. 154(b) by 737 days.

(21) Appl. No.: 12/720,096

(22) Filed: Mar. 9, 2010

(65) Prior Publication Data

US 2010/0232187 A1 Sep. 16, 2010

Related U.S. Application Data

(60) Provisional application No. 61/210,116, filed on Mar. 12, 2009.

(51) Int. Cl.
*H02M 3/335* (2006.01)

(52) U.S. Cl.
USPC .......................... 363/21.12; 363/49

(58) Field of Classification Search
USPC ...................... 363/21.12–21.18, 49
See application file for complete search history.

(56) References Cited

U.S. PATENT DOCUMENTS

| | | | | |
|---|---|---|---|---|
| 6,252,783 | B1 * | 6/2001 | Huh et al. | 363/21.01 |
| 6,646,894 | B2 * | 11/2003 | Hong et al. | 363/21.01 |
| 6,898,090 | B2 | 5/2005 | Nishida et al. | |
| 2005/0078492 | A1 * | 4/2005 | Takahashi | 363/21.15 |

FOREIGN PATENT DOCUMENTS

| | | |
|---|---|---|
| CN | 1485972 A | 3/2004 |
| CN | 1747308 A | 3/2006 |
| CN | 1819429 A | 8/2006 |

* cited by examiner

*Primary Examiner* — Harry Behm
*Assistant Examiner* — Matthew Grubb
(74) *Attorney, Agent, or Firm* — Rosenberg, Klein & Lee

(57) ABSTRACT

A control circuit of a power converter for light-load power saving according to the present invention comprises a first feedback circuit coupled to an output voltage of the power converter to receive a first feedback signal. A second feedback circuit is coupled to the output voltage to receive a second feedback signal. A control circuit generates a switching signal for switching a transformer of the power converter and regulating the output voltage of the power converter in response to the first feedback signal and the second feedback signal. The switching signal is generated in accordance with the first feedback signal when an output load is high. The switching signal is generated in accordance with the second feedback signal during a light-load condition.

20 Claims, 4 Drawing Sheets

OUTPUT VOLTAGE CONTROL CIRCUIT OF POWER CONVERTER FOR LIGHT-LOAD POWER SAVING

REFERENCE TO RELATED APPLICATION

This Application is based on Provisional Patent Application Ser. No. 61/210,116, filed 12 Mar. 2009, currently pending.

BACKGROUND OF THE INVENTION

1. Filed of Invention

The present invention relates in general to a control circuit of power converter, and more particularly, to an output voltage control circuit for offline power converter.

2. Description of Related Art

Switching power converters have been widely used to control the output power and provide regulated voltage and current. Based on the restriction of environmental pollution, power converters have been required to meet the power management and energy conservation standards. The principle of power management is to manage the system to consume power during its operation, and only a little quantity of power will be consumed during non-operation (sleep mode). With respect to the power converters in a power management application, saving power in the light-load condition is a major requirement. According to the invention, an output voltage control of an output voltage control circuit is to reduce the power consumption for light-load condition.

SUMMARY OF THE INVENTION

A control circuit of a power converter is developed to reduce the power consumption of light-load condition for power saving. It includes a first feedback circuit, a second feedback circuit and a control circuit. The first feedback circuit is coupled to an output voltage of the power converter to receive a first feedback signal. The second feedback circuit is coupled to the output voltage to receive a second feedback signal. The control circuit generates a switching signal for switching a transformer of the power converter and regulating the output voltage of the power converter in response to the first feedback signal and the second feedback signal. The switching signal is generated in accordance with the first feedback signal when an output load is high. The switching signal is generated in accordance with the second feedback signal during a light-load condition. Furthermore, the present invention provides another control circuit of the power converter for light-load power saving. It comprises a first primary-side feedback circuit, a second primary-side feedback circuit and a control circuit. The first primary-side feedback circuit generates a first primary-side feedback signal through a winding of a transformer. The second primary-side feedback circuit generates a second primary-side feedback signal through the winding of the transformer. The control circuit generates a switching signal for switching the transformer and regulating the output voltage of the power converter in response to the first primary-side feedback signal and the second primary-side feedback signal. The switching signal is generated in accordance with the first primary-side feedback signal when an output load is high. The switching signal is generated in accordance with the second primary-side feedback signal when the output load is low. The output voltage at light-load is lower than the output voltage at heavy-load.

BRIEF DESCRIPTION OF ACCOMPANIED DRAWINGS

DETAILED DESCRIPTION OF PREFERRED EMBODIMENTS

Figure 1:
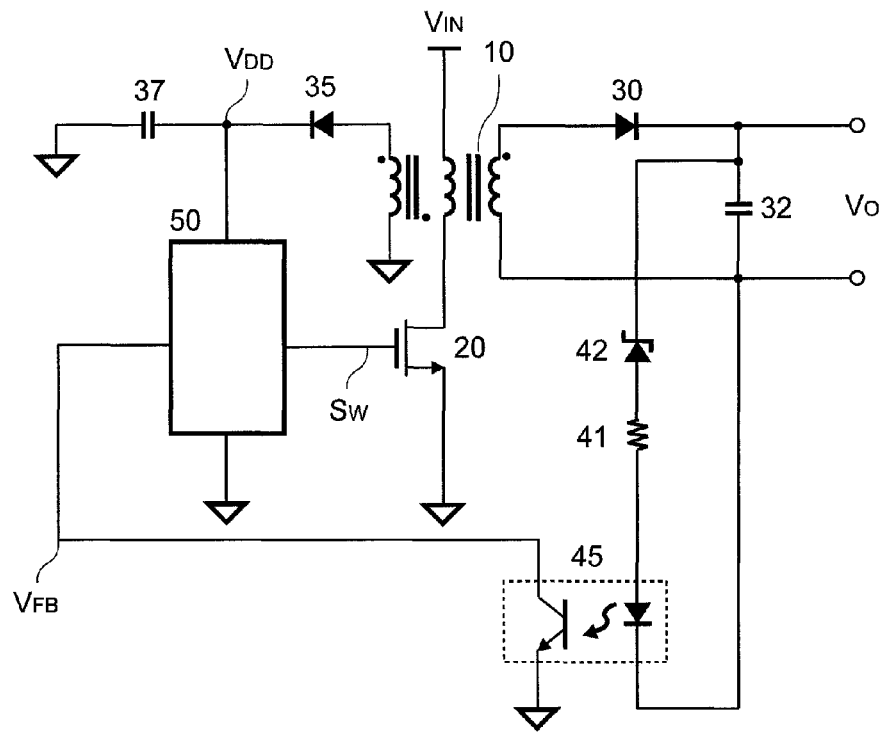
FIG. 1 shows a circuit diagram of a preferred embodiment of a power converter having a control circuit in accordance with the present invention.

FIG. 1 shows a power converter having a control circuit in accordance with the present invention. The control circuit 50 is coupled to an output voltage $V_O$ of the power converter to receive a first feedback signal $V_{FB}$ through an optical coupler 45. A resistor 41 and a zener diode 42 develop a first feedback circuit. A cathode of the zener diode 42 is coupled to the output voltage $V_O$ of the power converter. One terminal of the resistor 41 is coupled to an anode of the zener diode 42. Another terminal of the resistor 41 is coupled to the optical coupler 45. The first feedback circuit is coupled to the output voltage $V_O$ of the power converter to receive the first feedback signal $V_{FB}$ through the optical coupler 45. Therefore, the first feedback signal $V_{FB}$ is generated in accordance with the output voltage $V_O$ through the optical coupler 45. The control circuit 50 includes a second feedback circuit coupled to the output voltage $V_O$ to receive a second feedback signal $V_{DD}$ through a winding of a transformer 10 of the power converter. Therefore, the second feedback signal $V_{DD}$ is generated in accordance with the output voltage $V_O$ through the winding of the transformer 10. According to one embodiment of the present invention, the control circuit 50 receives the second feedback signal $V_{DD}$ through an auxiliary winding of the transformer 10 of the power converter.

The transformer 10 is coupled to receive an input voltage $V_{IN}$. A switch 20 is coupled from the transformer 10 to the ground for switching the transformer 10. According to one embodiment of the present invention, the switch 20 can be a power transistor. A rectifier 30 and a capacitor 32 are connected to the output winding of the transformer 10 for producing the output voltage $V_O$. A diode 35 and a capacitor 37 are coupled to the winding of the transformer 10 for generating the second feedback signal $V_{DD}$ that is correlated to the output voltage $V_O$. The second feedback signal $V_{DD}$ also provides a power source to the control circuit 50. The control circuit 50 generates a switching signal $S_W$ to control the switch 20 for switching the transformer 10 and regulating the output voltage $V_O$ of the power converter in response to the first feedback signal $V_{FB}$ and the second feedback signal $V_{DD}$. The switching signal $S_W$ is generated in accordance with the first feedback signal $V_{FB}$ when the output load of the power converter is high. The switching signal $S_W$ is generated in accordance with the second feedback signal $V_{DD}$ during the light-load condition. The output voltage $V_O$ at light-load is lower than the output voltage $V_O$ at heavy-load.

Figure 2:
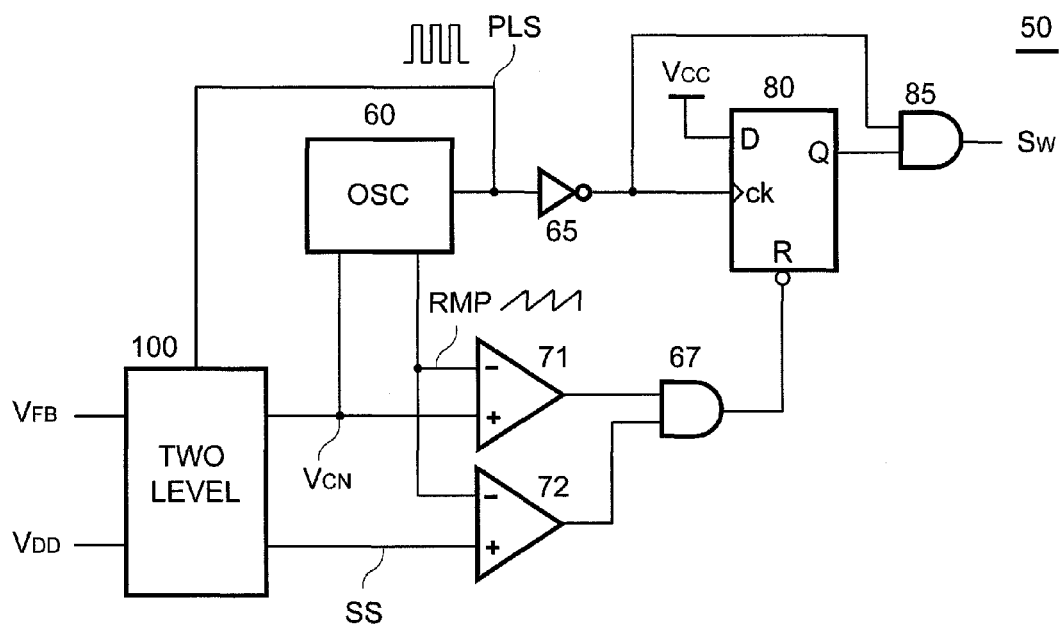
FIG. 2 is a circuit diagram of a preferred embodiment of the control circuit in accordance with the present invention.

FIG. 2 is a preferred embodiment of the control circuit 50 in accordance with the present invention. It includes an input circuit 100 (TWO LEVEL) coupled to receive the first feedback signal $V_{FB}$ and the second feedback signal $V_{DD}$ for generating a feedback signal $V_{CN}$ and a soft-start signal SS. An oscillator 60 (OSC) receives the feedback signal $V_{CN}$ for generating a pulse signal PLS that is coupled to turn on a D flip-flop 80 through an inverter 65. The pulse signal PLS is further coupled to the input circuit 100. An input of the inverter 65 is coupled to receive the pulse signal PLS. An output of the inverter 65 is connected to a first terminal of an AND gate 85 and a clock input ck of the D flip-flop 80. A supply voltage $V_{CC}$ is supplied with a D input of the D flip-flop 80. An output Q of the D flip-flop 80 is coupled to a second terminal of the AND gate 85. An output of the AND gate 85 outputs the switching signal $S_W$. The D flip-flip 80 is utilized to generate the switching signal $S_W$ through the AND gate 85. The switching signal $S_W$ is turned off by resetting the D flip-flop 80. An AND gate 67 and comparators 71, 72 are utilized to reset the D 80. The feedback signal $V_{CN}$ and the soft-start signal SS are connected to a positive input of the comparators 71 and 72 respectively. The oscillator 60 further generates a ramp signal RMP coupled to a negative input of the comparators 71 and 72 respectively. An output of the AND gate 67 is coupled to a reset input R of the D flip-flop 80. The AND gate 67 receives outputs of the comparators 71 and 72 to reset the D flip-flop 80 and turn off the switching signal $S_W$. According to the first feedback signal $V_{FB}$ and the second feedback signal $V_{DD}$, the control circuit 50 is to perform the pulse width modulation (PWM) for generating the switching signal $S_W$.

Figure 3:
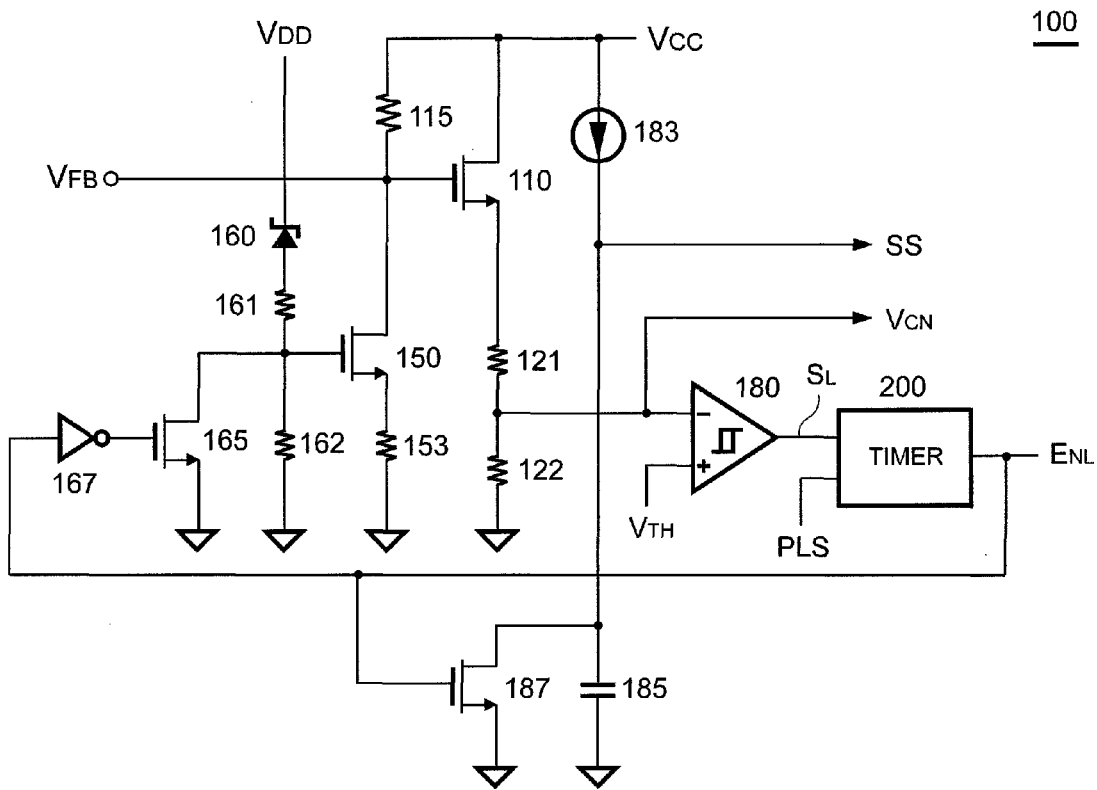
FIG. 3 is a circuit diagram of a preferred embodiment of the input circuit in accordance with the present invention.

FIG. 3 is a preferred embodiment of the input circuit 100 in accordance with the present invention. It includes a threshold circuit 180 coupled to receive the feedback signal $V_{CN}$ for determining the light-load condition and generating a light-load signal $S_L$. The threshold circuit 180 can be regard as a hysteresis comparator. A negative input of the threshold circuit 180 receives the feedback signal $V_{CN}$. A threshold signal $V_{TH}$ is supplied with a positive input of the threshold circuit 180. An output of the threshold circuit 180 outputs the light-load signal $S_L$. The light-load signal $S_L$ is further coupled to a timer 200 for generating a light-load enable signal $E_{NL}$. The light-load enable signal $E_{NL}$ is coupled to enable the second feedback signal $V_{DD}$ for the feedback signal $V_{CN}$. The timer 200 is further coupled to receive the pulse signal PLS for generating the light-load enable signal $E_{NL}$. A gate terminal of a level-shift transistor 110 receives the first feedback signal $V_{FB}$. The supply voltage $V_{CC}$ is supplied with a drain terminal of the level-shift transistor 110. A resistor 115 is coupled between the supply voltage $V_{CC}$ and the gate terminal of the level-shift transistor 110 to pull high the first feedback signal $V_{FB}$. Resistors 121 and 122 form a voltage divider coupled to a source terminal of the level-shift transistor 110 for generating the feedback signal $V_{CN}$.

A zener diode 160, resistors 161, 162, 153 and a transistor 150 develop the second feedback circuit. A cathode of the zener diode 160 receives the second feedback signal $V_{DD}$. One terminal of the resistor 161 is coupled to an anode of the zener diode 160. A gate terminal of the transistor 150 is coupled to another terminal of the resistor 161 and one terminal of the resistor 162. Another terminal of the resistor 162 is coupled to the ground. The resistor 153 is coupled between a source terminal of the transistor 150 and the ground. A drain terminal of the transistor 150 is coupled to the gate terminal of the level-shift transistor 110. As illustrated and discussed above, the second feedback circuit is coupled to receive the second feedback signal $V_{DD}$. The transistor 150 is connected to the level-shift transistor 110 for generating the feedback signal $V_{CN}$ when the second feedback circuit is enabled.

An input of an inverter 167 receives the light-load enable signal $E_{NL}$. A gate terminal of a transistor 165 is coupled to an output of the inverter 167. A drain terminal of the transistor 165 is coupled to the gate terminal of the transistor 150. A source terminal of the transistor 165 is coupled to the ground. The light-load enable signal $E_{NL}$ is coupled to enable or disable the second feedback circuit through the inverter 167 and the transistor 165. The transistor 165 is connected to the transistor 150 for disabling the transistor 150 and the second feedback circuit when the light-load enable signal $E_{NL}$ is disabled and the transistor 165 is on. Therefore, the feedback signal $V_{CN}$ is determined by the first feedback signal $V_{FB}$ when the transistor 150 is off. The transistor 165 is on and the transistor 150 is off through the inverter 167 once the light-load enable signal $E_{NL}$ is disabled.

On the other hand, the feedback signal $V_{CN}$ is determined by the second feedback signal $V_{DD}$ and the voltage of the zener diode 160 when the transistor 165 is off and the light-load enable signal $E_{NL}$ is enabled. The transistor 150 will control the gate terminal of the level-shift transistor 110. The voltage of the zener diode 160 and the second feedback signal $V_{DD}$ will determine the output voltage $V_O$ (shown in FIG. 1) when the feedback signal $V_{CN}$ is determined by the second feedback signal $V_{DD}$. The voltage of the zener diode 42 (shown in FIG. 1) will determine the output voltage $V_O$ once the feedback signal $V_{CN}$ is determined by the first feedback signal $V_{FB}$. The reference voltage of the second feedback signal $V_{DD}$ is lower than the reference voltage of the first feedback signal $V_{FB}$. The output voltage $V_O$ controlled by the second feedback signal $V_{DD}$ is lower than the output voltage $V_O$ controlled by the first feedback signal $V_{FB}$.

Referring to FIG. 3, a current source 183, a capacitor 185 and a transistor 187 develop a soft-start circuit for generating the soft-start signal SS. The current source 183 is coupled between the supply voltage $V_{CC}$ and one terminal of the capacitor 185. Another terminal of the capacitor 185 is coupled to the ground. A gate terminal of the transistor 187 receives the light-load enable signal $E_{NL}$. A drain terminal of the transistor 187 is coupled to the current source 183 and one terminal of the capacitor 185. The light-load enable signal $E_{NL}$ is coupled to discharge the capacitor 185 once the light-load enable signal $E_{NL}$ is at a high-level. When the light-load enable signal $E_{NL}$ is at a lowlevel, the capacitor 185 will be charged by the constant current source 183. The soft-start circuit generates the soft-start signal SS in response to the light-load enable signal $E_{NL}$. Thus, the switching signal $S_W$ is soft-started in accordance with the soft-start signal SS when the second feedback signal $V_{DD}$ is disabled and the first feedback signal $V_{FB}$ is enabled to control the switching signal $S_W$.

Figure 4:
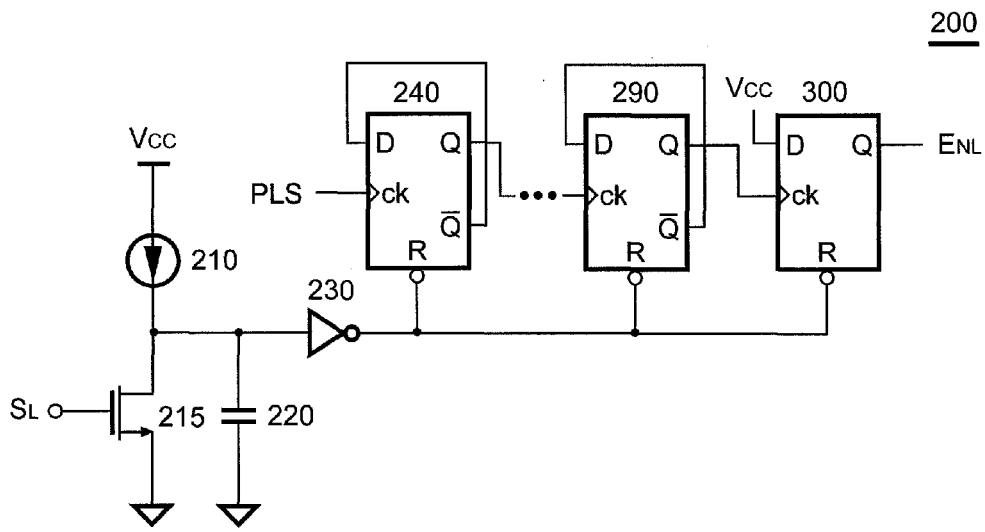
FIG. 4 is a circuit diagram of a preferred embodiment of the timer in accordance with the present invention.

FIG. 4 shows a preferred embodiment of the timer 200 in accordance with the present invention. It includes a constant current 210, a transistor 215, a capacitor 220, an inverter 230 and a plurality of D flip-flops 240, 290, 300. A gate terminal of the transistor 215 receives the light-load signal $S_L$. The constant current 210 is coupled from the supply voltage $V_{CC}$ to a drain terminal of the transistor 215. A source terminal of the transistor 215 is coupled to the ground. One terminal of the capacitor 220 is coupled to the drain terminal of the transistor 215. Another terminal of the capacitor 220 is coupled to the ground. The light-load signal $S_L$ is coupled to discharge the capacitor 220 once the light-load signal $S_L$ is at a high-level. When the light-load signal $S_L$ is at a low-level, the capacitor 220 will be charged by the constant current 210.

An input of the inverter 230 is coupled to the constant current 210, the drain terminal of the transistor 215 and one terminal of the capacitor 220. An output of the inverter 230 is coupled to reset inputs R of the D flip-flops 240, 290, 300 to reset the D flip-flops 240, 290, 300 when the light-load signal $S_L$ is at a low-level. The pulse signal PLS is supplied with a clock input ck of the D flip-flop 240 to clock the D flip-flop 240. A D input of the D flip-flop 240 is connected to its inverse output /Q. An output Q of the D flip-flop 240 is coupled to a clock input ck of the D flip-flop 290. A D input of the D flip-flop 290 is connected to its inverse output /Q. An output Q of the D flip-flop 290 is coupled to a clock input a of the D flip-flop 300. A D input of the D flip-flop 300 is coupled to receive the supply voltage $V_{CC}$. An output Q of the D flip-flop 300 outputs the light-load enable signal $E_{NL}$. The timer 200 is coupled to receive the light-load signal $S_L$ for generating the light-load enable signal $E_{NL}$. The light-load enable signal $E_{NL}$ is coupled to enable the second feedback signal $V_{DD}$.

Figure 5:
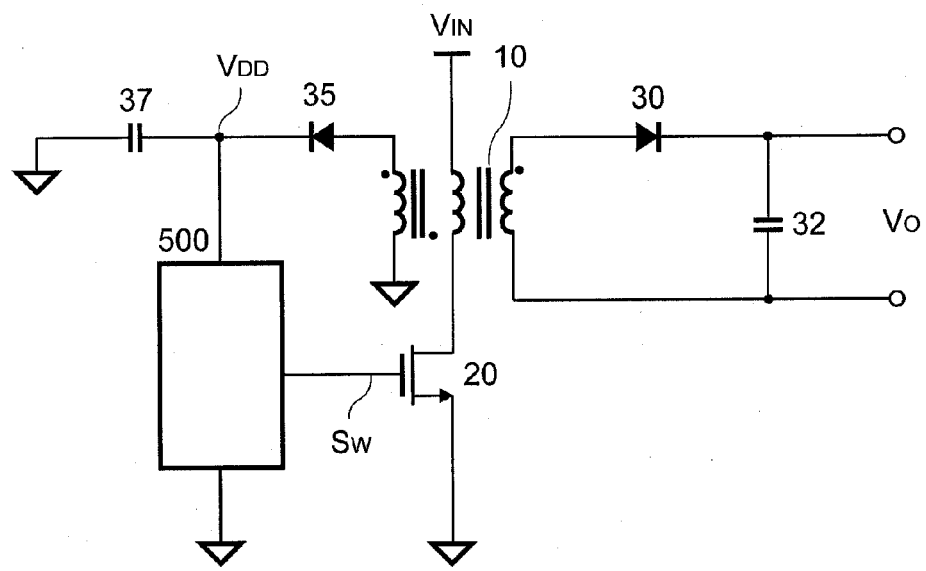
FIG. 5 is a circuit diagram of another preferred embodiment of a power converter having a control circuit in accordance with the present invention.

FIG. 5 is another preferred embodiment of a power converter having a control circuit 500 in accordance with the present invention. Comparing with FIG. 1 and FIG. 5, the first feedback circuit and the optical coupler 45 (shown in FIG. 1) are eliminated and the power converter is operated at primary-side control. Moreover, the control circuit 500 of this embodiment does not receive the first feedback signal $V_{FB}$ (Shown in FIG. 1) generated by the first feedback circuit. Other circuits of this embodiment are the same as the embodiment of FIG. 1 so here is no need to describe again.

Figure 6:
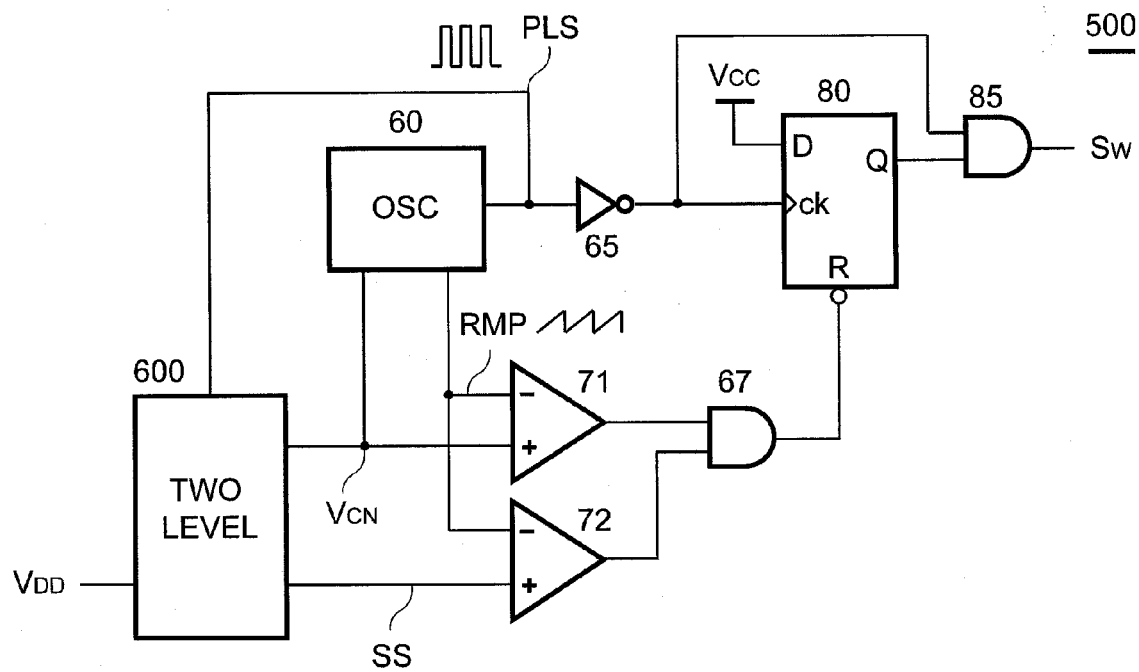
FIG. 6 is a circuit diagram of another preferred embodiment of the control circuit in accordance with the present invention.

FIG. 6 shows a preferred embodiment of the control circuit 500 in accordance with the present invention. It includes an input circuit 600 (TWO LEVEL) coupled to receive the second feedback signal $V_{DD}$ for generating the feedback signal $V_{CN}$ and the soft-start signal SS. Comparing with FIG. 2 and FIG. 6, the input circuit 600 does not receive the first feedback signal $V_{FB}$ generated by the first feedback circuit (shown in FIG. 1). Other circuits of the control circuit 500 are the same as the control circuit 50 shown in FIG. 2, so here is no need to describe again.

Figure 7:
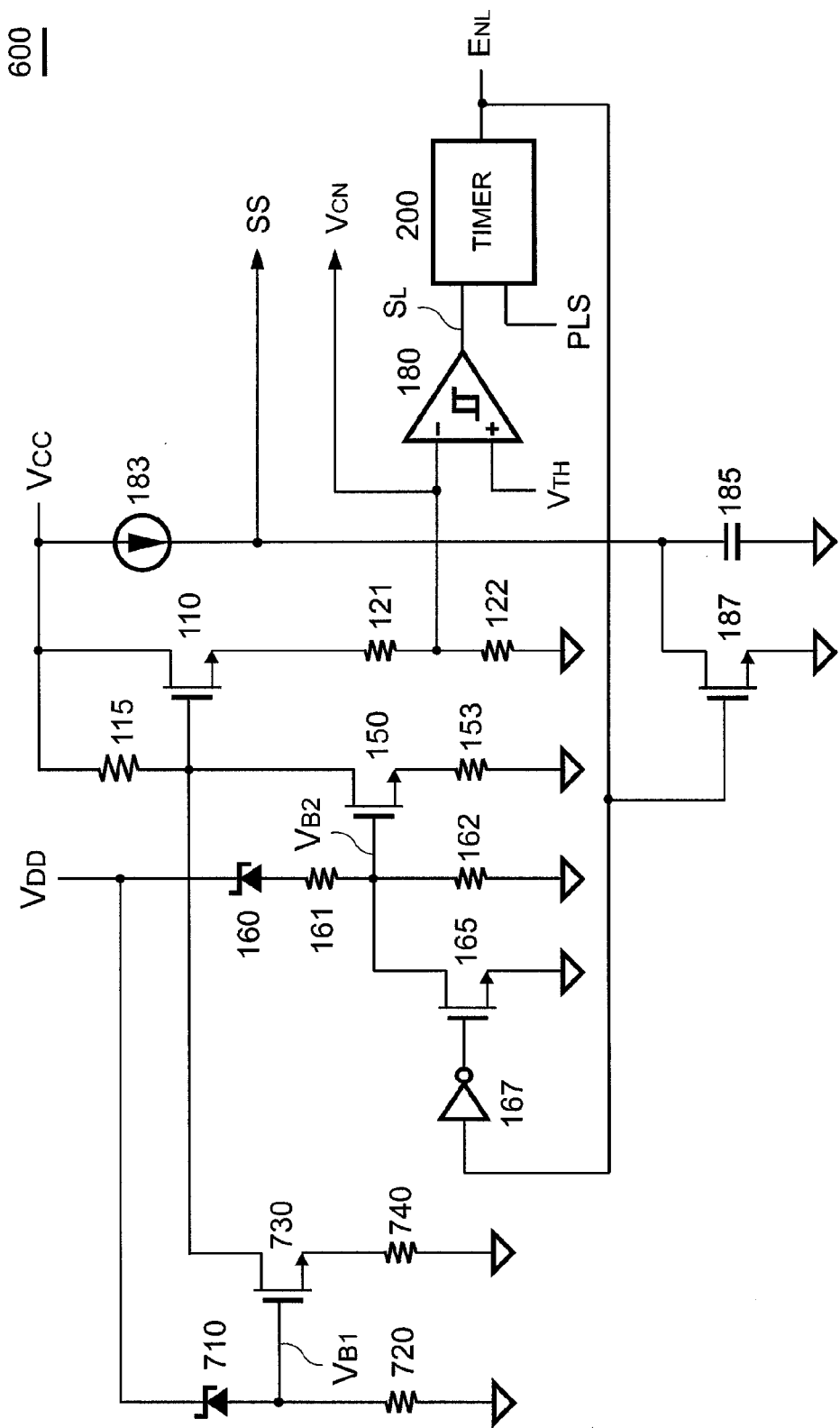
FIG. 7 is a circuit diagram of another preferred embodiment of the input circuit in accordance with the present invention.

FIG. 7 shows a preferred embodiment of the input circuit 600 in accordance with the present invention. Referring to FIG. 5, the control circuit 500 generates a first primary-side feedback signal $V_{B1}$ and a second primary-side feedback signal $V_{B2}$ (shown in FIG. 7) in accordance with the second feedback signal $V_{DD}$ through the winding of the transformer 10 (shown in FIG. 5). The second feedback signal $V_{DD}$ is correlated to the output voltage $V_O$, and therefore the control circuit 500 generates the first primary-side feedback, signal $V_{B1}$ and the second primary-side feedback signal $V_{B2}$ in accordance with the output voltage $V_O$. The switching Signal $S_W$ is generated for switching the transformer 10 and regulating the output voltage $V_O$ of the power converter in response to the first primary-side feedback signal $V_{B1}$ and the second primary-side feedback signal $V_{B2}$.

The input circuit 600 generates the feedback signal $V_{CN}$ in response to the first primary-side feedback signal $V_{B1}$ and the second primary-side feedback signal $V_{B2}$. The threshold circuit 180 is coupled to receive the feedback signal $V_{CN}$ for determining the light-load condition and generating the light-load signal $S_L$. The timer 200 is coupled to receive the light-load signal $S_L$ for generating the light-load enable signal $E_{NL}$. The light-load enable signal $E_{NL}$ is coupled to enable the second primary-side feedback signal $V_{B2}$.

A zener diode 710, resistors 720, 740 and a transistor 730 develop a first primary-side feedback circuit for regulating the output voltage $V_O$ in accordance with the second feedback signal $V_{DD}$ and the voltage of the zener diode 710. The first primary-side feedback circuit generates the first primary-side feedback signal $V_{B1}$ through the winding of the transformer 10 (shown in FIG. 5). A cathode of the zener diode 710 receives the second feedback signal $V_{DD}$. One terminal of the resistor 720 is coupled to an anode of the zener diode 710 and a gate terminal of the transistor 730 for generating the first primary-side feedback signal $V_{B1}$. Another terminal of the resistor 720 is coupled to the ground. A drain terminal of the transistor 730 is coupled to the gate terminal of the level-shift transistor 110. The resistor 740 is coupled between a source terminal of the transistor 730 and the ground.

The zener diode 160, resistors 161, 162, 153 and the transistor 150 develop a second primary-side feedback circuit. The second primary-side feedback circuit generates the second primary-side feedback signal $V_{B2}$ through the winding of the transformer 10 (shown in FIG. 5). The cathode of the zener diode 160 receives the second feedback signal $V_{DD}$. The resistor 161 is coupled from the anode of the zener diode 160 to the gate terminal of the transistor 150 for generating the second primary-side feedback signal $V_{B2}$. Other circuits of the input circuit 600 are the same as the input circuit 100 shown in FIG. 3, so here is no need to describe again. The transistor 165 is connected to the transistor 150 for disabling the transistor 150 and the second primary-side feedback circuit when the light-load enable signal $E_{NL}$ is disabled and the transistor 165 is on. Therefore, the feedback signal $V_{CN}$ is determined by the second feedback signal $V_{DD}$ and the voltage of the zener diode 710 that the feedback signal $V_{CN}$ is determined by the first primary-side feedback signal $V_{B1}$ when the transistor 150 is off. The transistor 165 is on and the transistor 150 is off through the inverter 167 once the light-load enable signal $E_{NL}$ is disabled.

On the other hand, the feedback signal $V_{CN}$ is determined by the second feedback signal $V_{DD}$ and the voltage of the zener diode 160 that the feedback signal $V_{CN}$ is determined by the second primary-side feedback signal $V_{B2}$ when the transistor 165 is off and the light-load enable signal $E_{NL}$ is enabled. The transistor 150 will control the gate terminal of the level-shift transistor 110. The voltage of the zener diode 160 and the second feedback signal $V_{DD}$ will determine the output voltage $V_O$ when the feedback signal $V_{CN}$ is determined by the second primary-side feedback signal $V_{B2}$. The voltage of zener diode 710 will determine the output voltage $V_O$ once the feedback signal $V_{CN}$ is determined by the first primary-side feedback signal $V_{B1}$. The voltage of the zener diode 160 is lower than the voltage of the zener diode 710. The reference voltage of the second feedback signal $V_{DD}$ is lower than the reference voltage of the first feedback signal $V_{FB}$. The switching signal $S_W$ is generated in accordance with the first primary-side feedback signal $V_{B1}$ when the output load is high (at heavy-load). The switching signal $S_W$ is generated in accordance with the second primary-side feedback signal $V_{B2}$ when the output load is low (at light-load). The reference voltage of the second primary-side feedback signal $V_{B2}$ is lower than the reference voltage of the first primary-side feedback signal $V_{B1}$. The output voltage $V_O$ at light-load is lower than the output voltage $V_O$ at heavy-load.

Referring to FIG. 7, the current source 183, the capacitor 185 and the transistor 187 develop the soft-start circuit for generating the soft-start signal SS. The switching signal $S_W$ is soft-started by the control circuit 500 (shown in FIG. 6) in accordance with the soft-start signal SS when the second primary-side feedback signal $V_{B2}$ is disabled and the first primary-side feedback signal $V_{B1}$ is enabled to control the switching signal $S_W$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit of a power converter for light-load power saving comprising:
   a first feedback circuit coupled to an output voltage of the power converter to receive a first feedback signal;
   a second feedback circuit coupled to the output voltage to receive a second feedback signal; and
   a control circuit generating a switching signal for switching a transformer of the power converter and regulating the output voltage of the power converter in response to the first feedback signal and the second feedback signal;
   wherein the control circuit comprises a threshold circuit determining a light-load condition and generating a light-load signal in response to the first feedback signal and the second feedback signal; the switching signal is generated in accordance with the first feedback signal when an output load is high; the switching signal is generated in accordance with the second feedback signal during the light-load condition.

2. The control circuit as claimed in claim 1, wherein the output voltage at the light-load condition is lower than the output voltage at a heavy-load.

3. The control circuit as claimed in claim 1, wherein the output voltage controlled by the second feedback signal is lower than the output voltage controlled by the first feedback signal.

4. The control circuit as claimed in claim 1, wherein the control circuit comprises:
   an input circuit coupled to receive the first feedback signal and the second feedback signal for generating a feedback signal;
   wherein the threshold circuit is coupled to receive the feedback signal for determining the light-load condition and generating the light-load signal.

5. The control circuit as claimed in claim 4, wherein the control circuit further comprises a timer coupled to receive the light-load signal for generating a light-load enable signal, wherein the light-load enable signal is coupled to enable the second feedback signal.

6. The control circuit as claimed in claim 1, wherein the control circuit comprises a soft-start circuit generating a soft-start signal, the switching signal is soft-started by the control circuit in accordance with the soft-start signal when the second feedback signal is disabled and the first feedback signal is enabled to control the switching signal.

7. The control circuit as claimed in claim 1, wherein the first feedback circuit is coupled to the output voltage of the power converter to receive the first feedback signal through an optical coupler, and the second feedback circuit is coupled to the output voltage to receive the second feedback signal through a winding of the transformer of the power converter.

8. A method of light-load power saving for a power converter comprising:
   generating a first feedback signal through an optical coupler;
   generating a second feedback signal through a winding of a transformer;
   determining a light-load condition and generating a light-load signal in response to the first feedback signal and the second feedback signal; and
   generating a switching signal for switching the transformer and regulating an output voltage of the power converter in response to the first feedback signal and the second feedback signal;
   wherein the switching signal is generated in accordance with the first feedback signal when an output load is high; the switching signal is generated in accordance with the second feedback signal during the light-load condition.

9. The method as claimed in claim 8, wherein the switching signal is soft-started when the second feedback signal is disabled and the first feedback signal is enabled to control the switching signal.

10. The method as claimed in claim 8, wherein the output voltage at the light-load condition is lower than the output voltage at a heavy-load.

11. The method as claimed in claim 8, wherein the output voltage controlled by the second feedback signal is lower than the output voltage controlled by the first feedback signal.

12. The method as claimed in claim 8, wherein the first feedback signal and the second feedback signal are generated in accordance with the output voltage of the power converter.

13. A control circuit of a power converter for light-load power saving comprising:
   a first primary-side feedback circuit generating a first primary-side feedback signal through a winding of a transformer;
   a second primary-side feedback circuit generating a second primary-side feedback signal through the winding of the transformer; and
   a control circuit generating a switching signal for switching the transformer and regulating an output voltage of the power converter in response to the first primary-side feedback signal and the second primary-side feedback signal;
   wherein the control circuit comprises a threshold circuit determining a light-load condition and generating a light-load signal in response to the first primary-side feedback signal and the second primary-side feedback signal; the switching signal is generated in accordance with the first primary-side feedback signal when an output load is high; the switching signal is generated in accordance with the second primary-side feedback signal during the light-load condition, the output voltage at light-load is lower than the output voltage at heavy-load.

14. The control circuit as claimed in claim 13, wherein the control circuit comprises:
   an input circuit generating a feedback signal in response to the first primary-side feedback signal and the second primary-side feedback signal; and
   a timer coupled to receive the light-load signal for generating a light-load enable signal, wherein the light-load enable signal is coupled to enable the second primary-side feedback signal;
   wherein the threshold circuit is coupled to receive the feedback signal for determining the light-load condition and generating the light-load signal.

15. The control circuit as claimed in claim 13, wherein the first primary-side feedback circuit and the second primary-side feedback circuit generates the first primary-side feedback signal and the second primary-side feedback signal in accordance with the output voltage of the power converter.

16. The control circuit as claimed in claim 13, wherein the control circuit comprises a soft-start circuit generating a soft-start signal, the switching signal is soft-started by the control circuit in accordance with the soft-start signal when the second primary-side feedback signal is disabled and the first primary-side feedback signal is enabled to control the switching signal.

17. A light-load power saving method for a primary-side control power converter comprising:
generating a first primary-side feedback signal and a second primary-side feedback signal through a winding of a transformer;
determining a light-load condition and generating a light-load signal in response to the first primary-side feedback signal and the second primary-side feedback signal; and
generating a switching signal for switching the transformer and regulating an output voltage of the power converter in response to the first primary-side feedback signal and the second primary-side feedback signal;
wherein the switching signal is generated in accordance with the first primary-side feedback signal when an output load is high; the switching signal is generated in accordance with the second primary-side feedback signal during the light-load condition, the output voltage at light-load is lower than the output voltage at heavy-load.

18. The light-load power saving method as claimed in claim 17, wherein the switching signal is soft-started when the second primary-side feedback signal is disabled and the first primary-side feedback signal is enabled to control the switching signal.

19. The light-load power saving method as claimed in claim 17, wherein a reference voltage of the second primary-side feedback signal is lower than a reference voltage of the first primary-side feedback signal.

20. The light-load power saving method as claimed in claim 17, wherein the first primary-side feedback signal and the second primary-side feedback signal are generated in accordance with the output voltage of the power converter.

* * * * *